United States Patent
Wales

[11] Patent Number: 5,640,432
[45] Date of Patent: Jun. 17, 1997

[54] CO-CHANNEL INTERFERENCE SUPPRESSION SYSTEM

[75] Inventor: Stephen William Wales, Southampton, England

[73] Assignee: Roke Manor Research Limited, Hampshire, England

[21] Appl. No.: 385,819

[22] Filed: Feb. 9, 1995

[30] Foreign Application Priority Data

Feb. 10, 1994 [GB] United Kingdom ............ 9402564

[51] Int. Cl.⁶ ............................................ H04B 1/10
[52] U.S. Cl. ............................ 375/346; 375/341
[58] Field of Search ........................ 375/346, 341

[56] References Cited

U.S. PATENT DOCUMENTS

| | | | |
|---|---|---|---|
| 5,091,918 | 2/1992 | Wales | 375/346 |
| 5,199,047 | 3/1993 | Koch | 375/231 |
| 5,202,903 | 4/1993 | Okanoue | 375/341 |
| 5,307,374 | 4/1994 | Baier | 375/341 |
| 5,325,402 | 6/1994 | Ushirokawa | 375/346 |
| 5,349,607 | 9/1994 | Moreno | 375/346 |
| 5,406,585 | 4/1995 | Rohani et al. | 375/346 |

FOREIGN PATENT DOCUMENTS 9110295  7/1991  WIPO ............................ 375/346

*Primary Examiner*—Stephen Chin
*Assistant Examiner*—Jeffrey W. Gluck
*Attorney, Agent, or Firm*—Hill, Steadman & Simpson

[57] ABSTRACT

A communication system wherein known data sequences characterize both wanted transmitted signals and interfering co-channel transmitted signals, comprising a receiver for receiving a wanted transmitted signal in the presence of unwanted co-channel interfering signals. The receiver comprises a signal sequence identifier means which includes a memory for known data sequences and a correlator which serves to correlate received signals with the stored known data sequences, whereby the relative location in time of received signal sequences is identified. An impulse response estimator means operative for estimating the impulse response of each signal the location of which has been identified, and a means responsive to the estimated impulse responses for producing in respect of each said response a set of possible signal configurations, and detector means including means for comparing the signals of each set with the received signal thereby to filter the wanted signal are interconnected to perform the desired function.

5 Claims, 5 Drawing Sheets

Key
RF BB  RF to Baseband Converter
A D    Analogue to Digital Converter
ISU    Interference Suppression Unit
KSL    Known Sequence Location
IRE    Impulse Response Estimator
MG     Metric Generator
SSG    Signal Set Generator
SE     Sequence Estimator

CO-CHANNEL INTERFERENCE SUPPRESSION SYSTEM

BACKGROUND OF THE INVENTION

1. Field of the Invention

The present invention relates generally to the field of telecommunications, and more particularly, the present invention relates to an improved co-channel suppression system for use in radio telecommunications.

2. Description of the Prior Art

In many radio systems, available frequencies are re-used in adjacent geographic areas to provide increased traffic capacity for a given bandwidth. Frequency use, however, is fundamentally limited by the tolerance of a receiver to co-channel interference. Although transmission formats largely dictate the extent of this tolerance, techniques such as antenna diversity reception, adaptive power control or adaptive antennas may be used to improve upon this. Adaptive and diversity antennas have limited application, however, and ideally the suppression of co-channel interference using the signal from a single antenna is therefore desirable.

The level of interference that a receiver can tolerate fundamentally limits system capacity because frequencies (or channels) are re-used spatially. The more interference a receiver can tolerate, the greater the proportion of available frequencies which can be used at each base station. Receivers in land based mobile radio systems are rarely designed to account for the presence of interference, rather the system is configured to reduce the level of interference experienced to an acceptable level. If, however, the detection processes in a receiver are modified explicitly to account for the presence of a number of like modulated co-channel interfering signals, then the receiver can potentially tolerate a much greater level of co-channel interference and the system capacity can therefore advantageously be increased.

It is an object of the present invention therefore to provide a system which will operate to suppress similar digitally modulated co-channel interference using the signal from a single antenna.

It is a further object of the present invention to provide a system which can be applied to an existing system with minimal modification.

According to the present invention, in a communication system wherein known data sequences characterize both wanted transmitted signals and interfering co-channel transmitted signals, a receiver for receiving a wanted transmitted signal in the presence of unwanted co-channel interfering signals comprises a signal sequence identifier means which includes a memory for storing known data sequences and a correlator which serves to correlate received signals with the stored known data sequences. The relative location in time of received signal sequences is thus identified. An impulse response estimator estimates the impulse response of each signal, the location of which has been identified, and a means responsive to the estimated impulse responses produces a set of possible signal configurations in respect of each said response. A detector means includes a means for comparing the signals of each set with the received signal to thereby process the desired signal.

The sequence identifier may be fed with the received signal via a baseband signal converter and an A-to-D converter which in combination serve to provide digital signal samples of the received signal at baseband frequencies.

The means for comparing the signals of each set with the received signal may comprise a metrics generator responsive to the sets for providing signals for a sequence estimator comprising a trellis processor from which an output signal comprising a detected data sequence corresponding to the wanted signal is provided.

The baseband signal converter may be fed with a signal from a single antenna and may be used instead of a demodulator/equalizer in an existing system to thereby provide improved co-channel interference suppression with minimal modification to the existing system.

BRIEF DESCRIPTION OF THE DRAWINGS

One embodiment of the invention will now be described by way of example only with reference to the accompanying drawings, wherein.

DETAILED DESCRIPTION OF THE PREFERRED EMBODIMENTS

Figure 1:
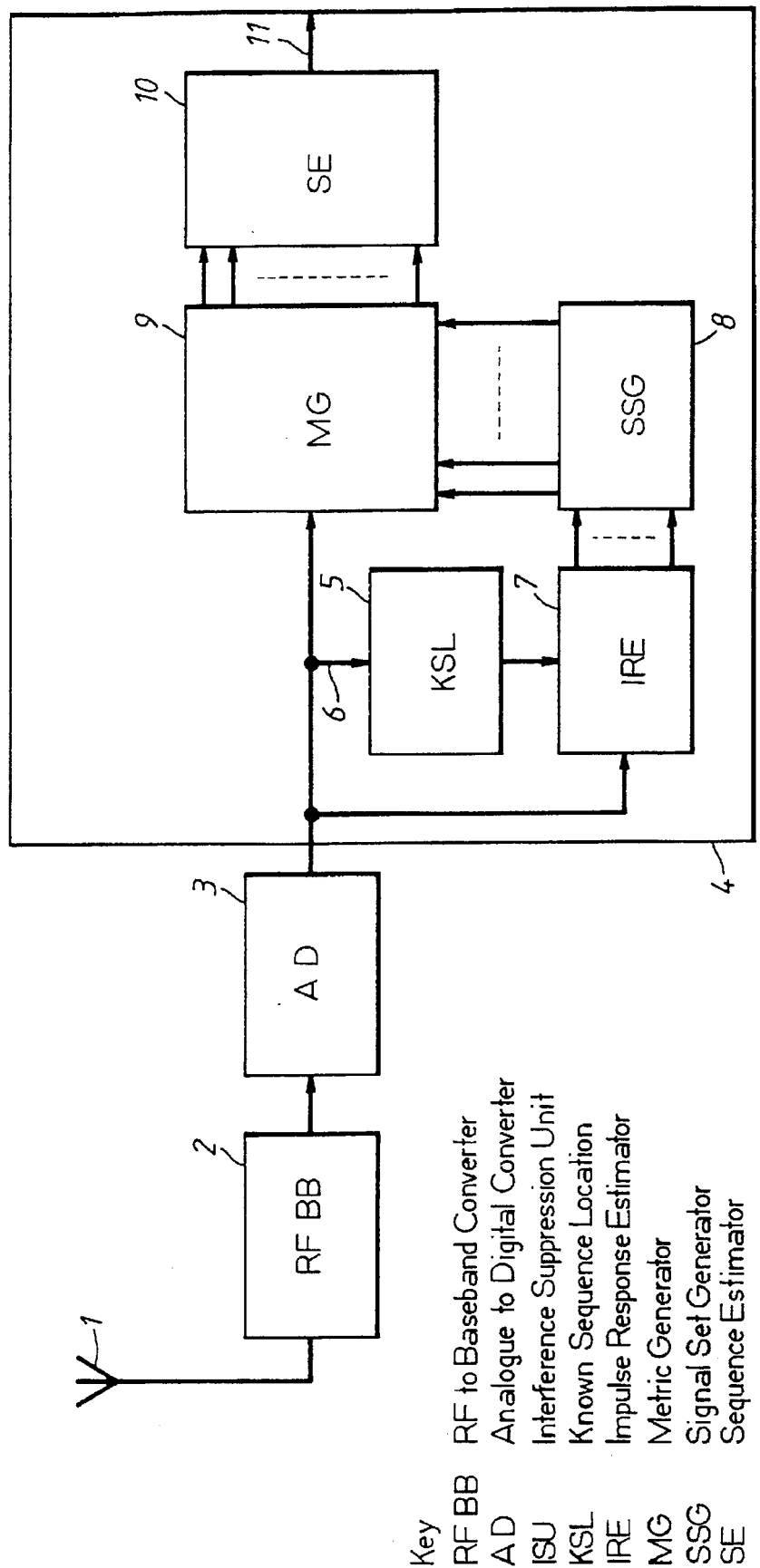
FIG. 1 is a simplified block schematic diagram of a land based mobile radio receiver.

Referring now to FIG. 1 of the drawings, the receiver comprises a single antenna 1 which is arranged to feed an RF to baseband signal converter 2. Output signals at baseband from the RF to baseband signal converter 2 are fed to an analog to digital converter 3 which provides digital signal samples of the received baseband signal. These samples are fed to an interference suppression unit 4 comprising operational blocks which will now be described and which are shown within a shaded region of the drawing. The interference suppression unit comprises a known sequence locator 5 including a memory which contains all known data sequences and a correlator which serves to correlate a received signal present on a line 6 which is fed from the A to D converter 3 with the known data sequences contained within the memory.

Position estimate signals from the known sequence locator 5 corresponding to the received signal are fed to an impulse response estimator 7 which serves to calculate with respect to each data sequence signal identified, a corresponding impulse response, the character of which is determined by the channel path in the ether through which the signal has traveled. As will readily be appreciated, the wanted signal and the unwanted signals will each be characterized by a different impulse response since they travel through different channel paths. Signals from the impulse response estimator 7 are fed to a signal set generator 8 which serves to produce a set of possible signals with respect to each signal. The signal sets thus produced are fed to a detector arrangement comprising a metrics generator 9 and a sequence estimator 10 (which is in effect a trellis processor), thereby to provide an output signal on a line 11, which comprises an estimated data sequence corresponding to the wanted received signal. The metrics generator and the sequence estimator or trellis processor 10, in combination, serve in effect to compare the signals of each set with the received signal, whereby the wanted signal is detected.

The manner in which the individual blocks of the interference suppressor 4 operate will now be described in greater detail with reference to FIGS. 2, 3 and 4.

Figure 2:
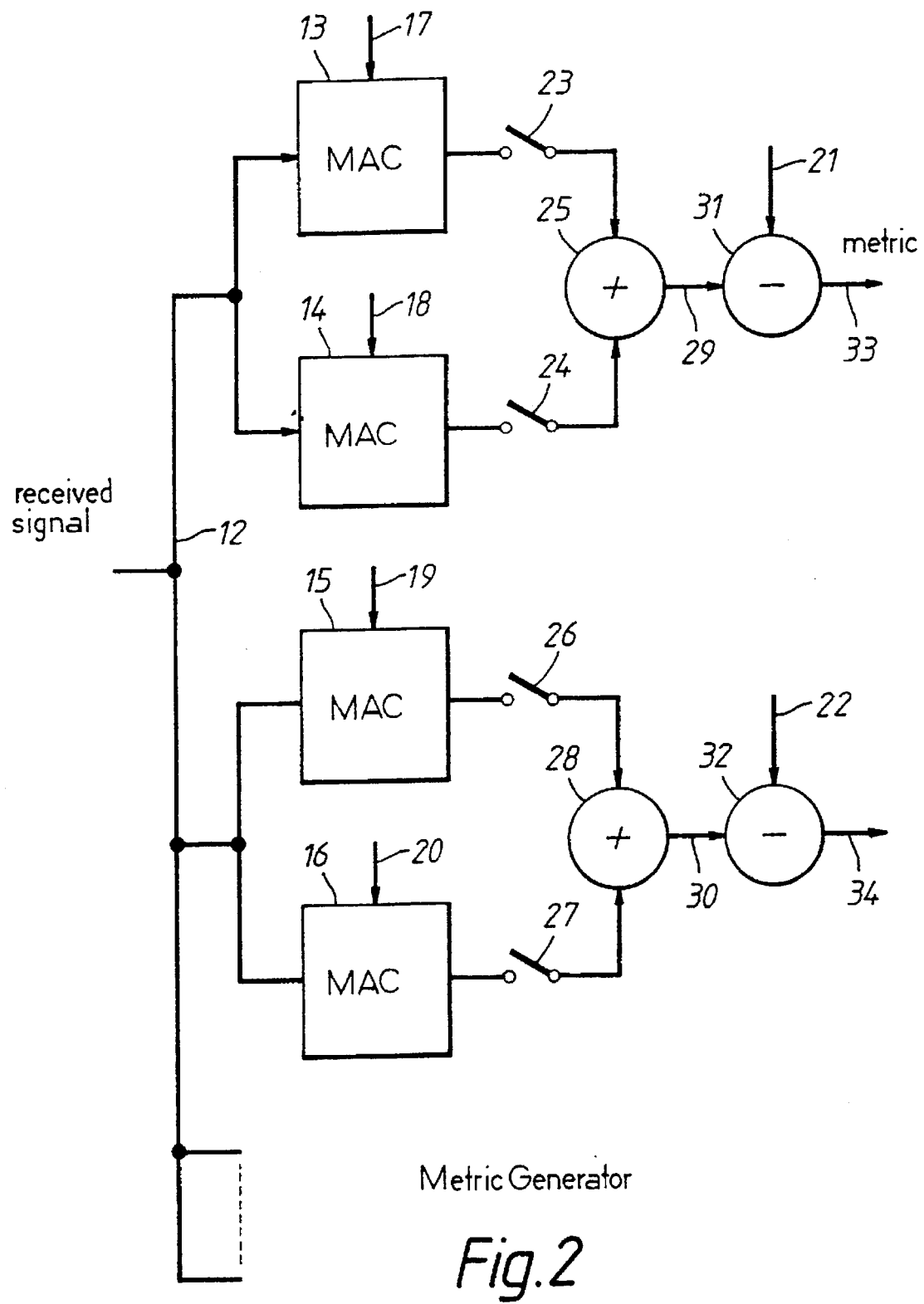
FIG. 2 is a block schematic diagram of the metrics generator 9 shown in FIG. 1.

Referring now to FIG. 2, which shows in more detail the metrics generator 9, received signals from the A-to-D converter 3 are fed on a line 12 to a number of multiplication/ accumulator (MAC) units 13, 14, 15 and 16 which serve to multiply and accumulate over each data symbol period received signal samples on the line 12 with signals from the signal set generator 8 that are applied to lines 17 to 20. The input signals to lines 17 to 20 are generated from the plurality of output lines 51 to 52 respectively, from the memory 46 (FIG. 3). The signals on each of the lines have been shown in accordance with their mathematical description. Although only four MAC units 13, 14, 15 and 16 are shown in FIG. 2, it will be understood that one MAC unit will be provided for each possible signal in the signal set in FIG. 1. Signals from the MAC units 13 and 14 are fed via switches 23 and 24 to an adder 25 and signals from the MAC units 15 and 16 are fed via switches 26 and 27 to an adder 28 thereby to provide output signals on lines 29 and 30 respectively for subtraction units 31 and 32 which are fed also via lines 21 and 22 respectively with signals from the signal set generator 8, thereby to provide output signals on lines 33 and 34 which are fed to the sequence estimator 10.

Figure 3:
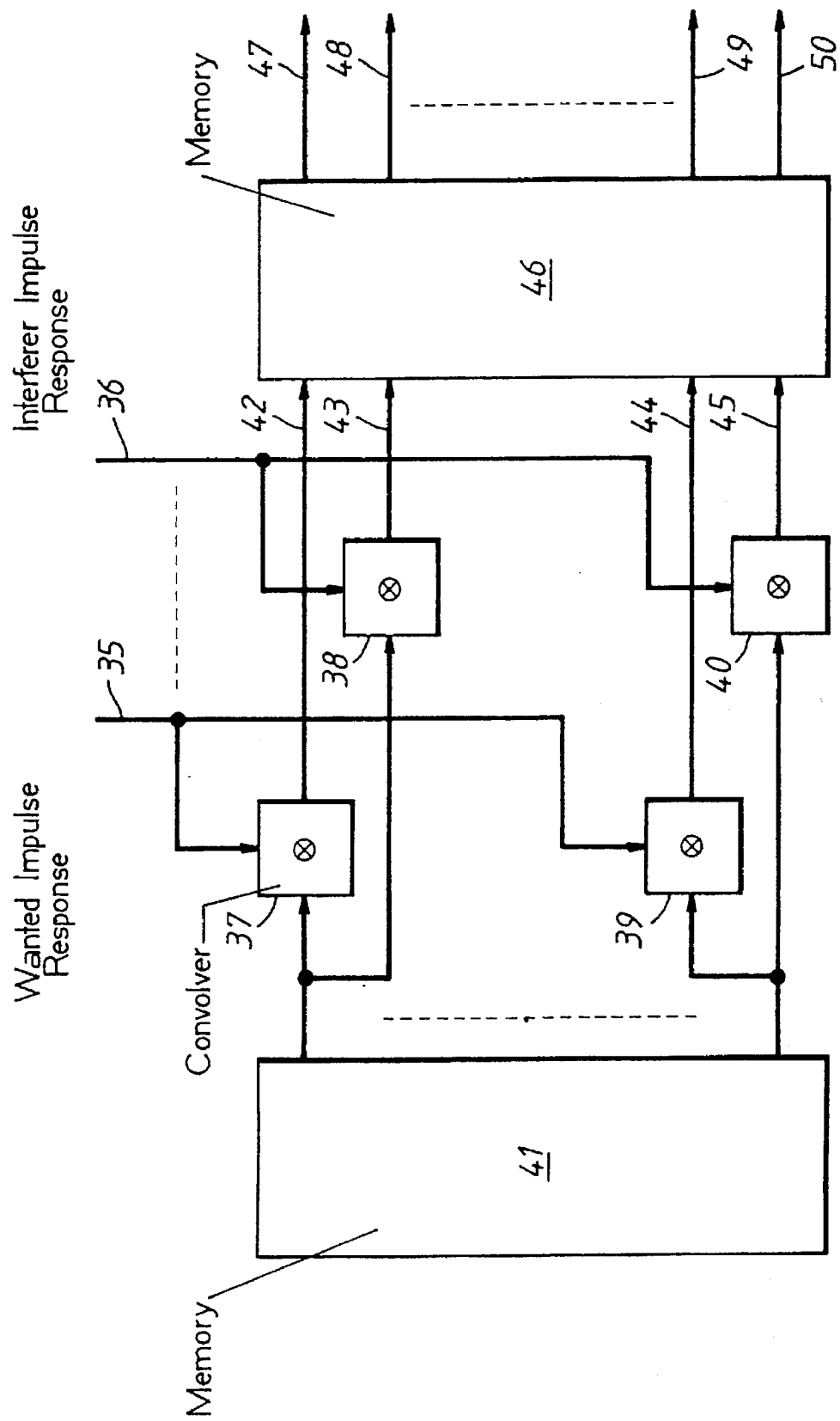
FIG. 3 is a block schematic diagram of the signal set generator 8 shown in FIG. 1.

Referring now to FIG. 3, the signal set generator 8 is fed on lines 35 and 36 from the impulse response estimator 7 with signals corresponding to the wanted impulse response and the interferer impulse response respectively. The lines 35 and 36 are arranged to feed multipliers 37, 38, 39 and 40. These multipliers are also fed from a memory 41 containing all possible signal patterns over a predetermined number of symbol intervals. Output signals from the multipliers 37, 38, 39 and 40 are fed on lines 42, 43, 44 and 45 to a temporary memory 46 which contains results of a convolution. Output signals are produced on lines 47, 48, 49, 50, 51, and 52 only six of which are shown in the drawing, thereby to provide input signals for the metric generator 9 and are shown bearing their mathematical description.

Figure 4:
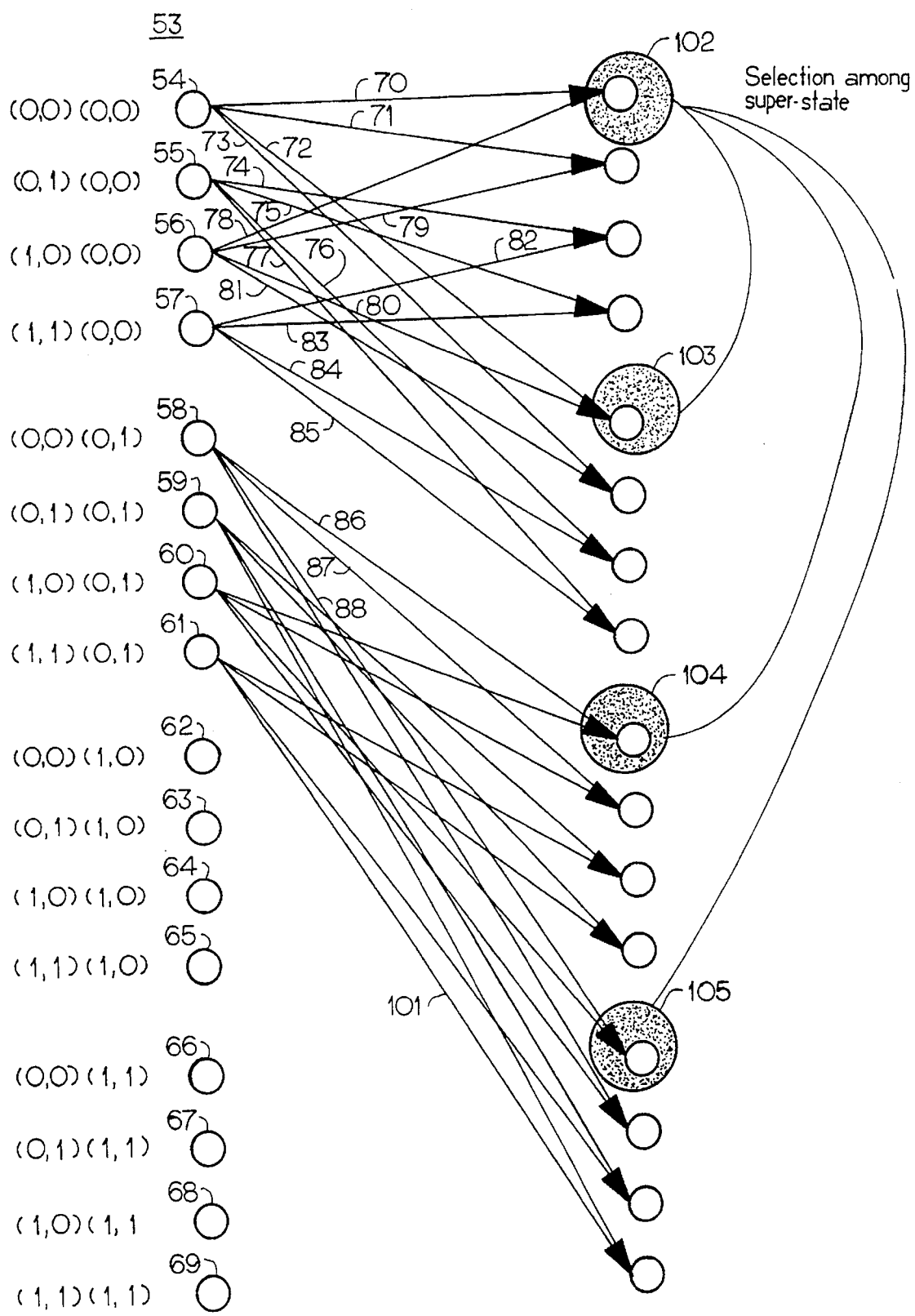
FIG. 4 is a diagram illustrating operation of the sequence estimator 10 shown in FIG. 1.

Referring now to FIG. 4, the sequence estimator 10, which in effect comprises a trellis processor, operates on the signals provided from the metrics generator 9 as shown in FIG. 1 and comprises the digital state possibilities as indicated in column 53 of FIG. 4, so as to provide an output signal on the line 11 which corresponds to that signal which has the largest probability over between 10 and 20 data symbols.

Figure 5:
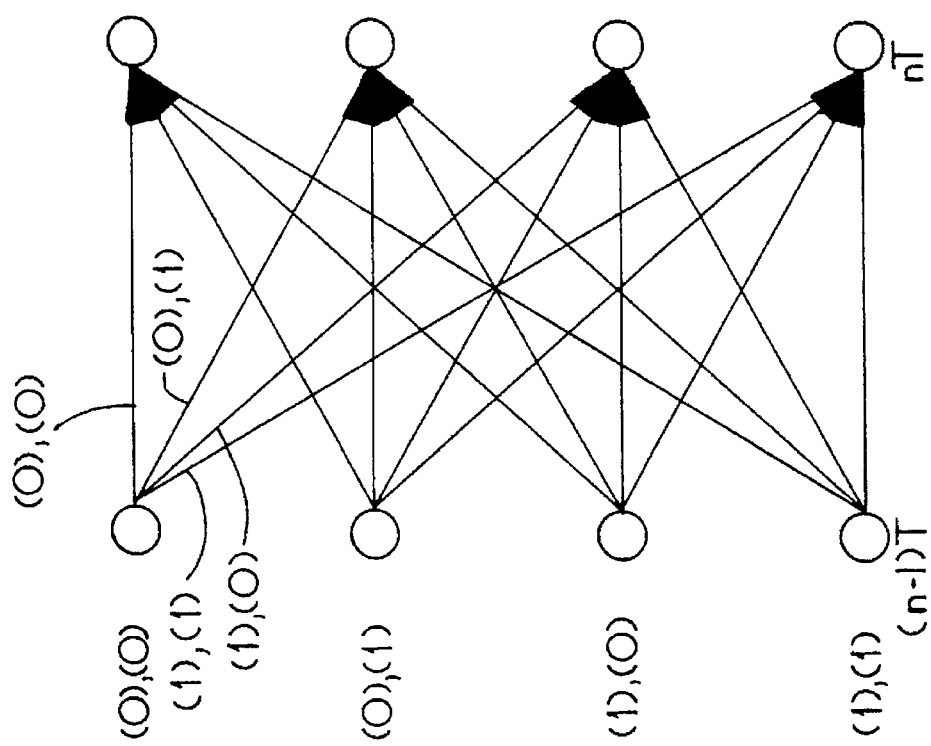
FIG. 5 is a diagram illustrating operation of a super-state trellis.

More detailed operation of the apparatus hereinbefore described will now be considered. Considering firstly the sequence estimator 10, an efficient optimum technique for performing maximum likelihood sequence estimation is the Viterbi algorithm. The Viterbi algorithm is generally well known to those skilled in the art, but attention is hereby directed to Proc. IEEE Volume 61, 1973, pages 268 to 278 for further information. In applying the Viterbi algorithm to conventional equalization/demodulation problems the output of the channel prior to noise addition is viewed as a finite state Markov process. For linear modulation methods the states of this process relate to data sequences of length v, which span the memory of the channel and modulation process. The output of the channel can then be described by a sequence of these states, and the task of the Viterbi algorithm is to find the sequence of states with the highest probability of occurrence. This sequence becomes the estimated data sequence, i.e. the output 11, if each state in the conventional equalization/demodulation process for the signal is described by a state decriptor $\xi_i$ for the i-th state. As each interfering signal can be similarly described, then for the K interfering signals, the super-state $\Xi_i$ can be defined as being formed from the K+1 state descriptors of the K+1 signals: $\Xi_i = (\xi i_o, \ldots \xi i_K)$. If there are S states describing each signal, then there are $S^{K+1}$ super states, and because each set of states describes a finite state Markov process, then this property applies to the super-states also. Describing each state by the v-tuple of data symbols: $(a_{n-1}, \ldots a_{n-v})$, $a_i \epsilon [0,M-1]$, then there are M transitions emanating from each state, corresponding to the M possible values that the n-th data symbol can take. So from each super-state there are $M^{K+1}$ transitions. The progression of a data sequence in terms of its state description can be represented on a trellis diagram, which shows all possible transitions between super-states at time (n-1)T and time nT. The trellis diagram of the super-state trellis for M=2;v=1;K=1 is depicted in FIG. 5.

This is the simplest non-trivial super-state trellis for this particular problem, applying to a binary modulation, a single interferer and where the channel and modulation process have a memory of one symbol. For each transition in the trellis the following incremental metric is calculated which is effected by the metric generator 9.

$$\gamma_{i,j} = \sum_{l=0}^{\lambda-1} \left| r(l+n^\lambda) - \sum_{k=0}^{K} c_k(l,d_k^{i,j}) \right|^2 \quad (1)$$

where $\gamma_{i,j}$ is the incremental metric for the transition between super-state i and super state j. The data symbol sequences of length v+1 symbols causing this transition are denoted by $a_k^{i,j}$. In equation (1), r(I) is the I-th sample of the received signal at time IT/$\lambda$, where $\lambda$ is the number of samples per data symbol period (T). The signals $C_k(I,a_k^{i,j})$ are generated by the signal set generator 8, from the impulse response of the k-th channel, according to equation (2) below:

$$c_k(l,d_k^{i,j}) = \sum_{j=0}^{D\lambda} h_k(j) s(l-j,d_k^{i,j}) \quad (2)$$

where D is the duration of the channel impulse response in symbol periods, $h_k(j)$ the j-th coefficient of the channel impulse response for the k-th interferer, obtained from the channel impulse response estimator 7 and "$s(1-j,a_k^{i,j})$" is a sample value stored in memory 41. The accumulated metric for the i-th super-state is denoted by $\Gamma_i$, and so for the n-th data symbol the following selection procedure is performed at each super-state.

$$\Gamma_j = \min_{i \in \alpha} [\Gamma_i + \gamma_{i,j}] \quad (3)$$

where $\alpha$ is the set of super-states merging in the j-th super-state. At the j-th new state the old state that gives rise to the smallest accumulated metric is added to a buffer, which stores the sequence of states leading to the j-th state. If the observation length of the receiver is N symbols, then the detected data symbol is recovered from the state stored N symbols previously and is associated with the current state with the smallest accumulated metric. Both wanted and interfering data sequences can be detected using this technique.

A metric generation element for the trellis of FIG. 5 is implemented in FIG. 2, where the boxes marked MAC indicate a multiply-accumulate operation, the output of which is sampled every data symbol period. The expression for the incremental metric has been taken and simplified to group all terms not involving the received signal into one term $\alpha(a_o^{i,j}, a_i^{i,j})$ given in equation (4) below. This is then calculated each time the impulse response estimate is updated. A term involving the modulus of the received signal is removed (being independent of the data sequence $a_k^{i,j}$) and the minimization replaced by a maximization.

$$\alpha(d_0^{ij}, d_1^{ij}) = \sum_{l=0}^{\lambda-1} 2Re[c_0(l,d_0^{ij})c^*{}_1(l,d_1^{ij})] - |c_0(l,d_0^{ij})|^2 - |c_1(l,d_1^{ij})|^2 \quad (4)$$

The result is to make the metric generation process considerably more computationally efficient, providing the impulse response estimate does not require updating too regularly. For the single interfering signal, only twice the number of multiplications are required over the conventional detector. However, the number of additions is increased in proportion to the increase in the number of states.

The super-state trellis approach, described above, provides an optimal solution to the detection of k+1 signals in the presence of interference and Gaussian noise. The complexity of the super-state trellis means that its application is restricted to situations where the memory of the channel and modulation process is only a few symbols and when only a single interferer has to be suppressed. A simplification to the sequence estimator is now described, where only a subset of super-states are considered at each symbol interval.

A basic rule concerning the selection of this subset of super-states is that it should contain S states that differ in their state descriptor for the wanted signal. This is especially important at high signal to interference ratios, as otherwise performance will be sacrificed. The selection of the subset of states should be based upon straightforward comparison of transitions that merge in a common super-state, and which are supplemented by selection between super-states.

A procedure to select among super-states is illustrated in FIG. 4. A selection is made among super-states that have the same state descriptor for the wanted signal, differing only in that for the interfering signals, the selection is made on the transition with the largest probability entering any of this set of super-states. This is denoted as wanted signal merger selection. Alternatively the selection can be made between states that merge in the state descriptor for the interfering signal. This type of selection may be preferable whenever the time dispersion in the channel for the interfering signal exceeds that for the wanted signal.

Using the wanted signal merger selection a reduced state algorithm has been devised whereby (N+1)S states are retained. The procedure is illustrated in FIG. 4 for the case where N=1 and is the number of superstate subsets, and S=4, where S is the number of states in the trellis of the wanted signal and reference will be made to this Figure in the following explanation. In each data symbol period, the algorithm computes the probabilities for the transitions emanating from the (N+1)S states retained from the previous symbol period, states 54–61 of FIG. 4. The algorithm then has to select (N+1)S states for the $M^{K+1}(N+1)S$ expansions, 70–101 of FIG. 4, where M is the number of modulation levels, and K is the number of interfering signals. There are S sets of $M^{K+1}(N+1)$ state expansions that merge in a common state descriptor for the wanted signal; as an example one set is states 102–105 of FIG. 4. From each set, the N+1 state expansions with the largest probabilities, and which have a unique super-state, are selected. State expansions which merge into a super-state (for example expansions 70 and 78 in FIG. 4), have the conventional selection rule applied to them (equation (3)) before the selection is made amongst merges in the wanted signal state. In FIG. 4, if the expansions 70, 72, 86 and 88 survive from the conventional selection procedure, and expansion 72 has the largest probability followed by expansion 86, then state 103 and 104 will be selected for expansion in the next symbol interval; in the conventional procedure all would be retained. The selection procedure ensures no duplication of super-states, but makes the number of operations for each subset selection dependent upon the super-states selected, because the number of expansions merging in a super-state is variable.

Although this method of selection involves a sorting operation, a comparison with the M-algorithm shows that the complexity of this has been reduced by a factor of S. For a single interfering signal, and using 2S states in the super-state trellis, the complexity is 4.8 times that of the detector for a single signal. For a better understanding of the M-algorithm, reference may be made to an article by J. B. Anderson and S. Mohan entitled "Sequential Decoding Algorithms: A Survey and Cost Analysis", *IEEE Trans. on Communications* Volume COM-32, No. 2, February 1984, pages 169–176.

Turning now to the channel impulse response estimator 7 as shown in FIG. 1, its operation will now be considered in more detail.

The channel estimation technique herein described relies on some portion of the transmitted signal being known at the receiver. Typically this takes the form of some known data symbols inserted into the information content at the start of each transmission. The interfering signals are assumed to use different sets of data symbols in this known part. This practice is desirable whether the receivers in a mobile radio system use interference mitigation or not. Initially the problem is estimating the impulse response of both wanted and interfering signals where transmissions are arranged so that at the receiver the known data sequences are time-aligned. Clearly this is an impractical proposition, but it is a necessary step in the development of techniques which only assume knowledge of the wanted signal's known data content, allowing the condition of time-aligned transmissions at the receiver to be dropped.

For the case of a signal received in the presence of some additive noise, the most common method of estimating the channel impulse response is to find the set of coefficients ($\hat{h}$) which minimize the following quantity:

$$|e|^2 = \min_{\hat{h}} \|r - \hat{h}S\|_2 \quad (5)$$

A vector notation has been adopted in this section wherein $\hat{h}$ is a (Dλ+1) element row vector, S a (Dλ+1) XN circulant matrix, where N is the length of the known signal, r is an N-element row vector containing samples of the received signal at the position of the known data sequence and $\|\cdot\|_2$ denotes the vector 2-norm. The coefficients obtained in the minimization are those of a Wiener filter, and are the minimum mean square error estimate whenever the auto-correlation function of the transmitted signal is a delta function.

The extension of this procedure to deal with multiple signals is quite straightforward. The quantity involved in the minimization to obtain the impulse response coefficients becomes:

$$|e|^2 = \min_{\hat{h}_k} \left\| r - \sum_{k=0}^{K} \hat{h}_k S_k \right\|_2 \quad (6)$$

Differentiation with respect to the impulse response coefficients and setting the result to zero yields a set of simultaneous equations from which recursive and block estimation procedures can derived.

$$\frac{\partial}{\partial \hat{h}_l}(ee^*) = -2S_l^H \left( r - \sum_{k=0}^{K} \hat{h}_k S_k \right) \quad (7)$$

Defining $\Phi_{i,j} = S_i S_j^H$ as being the cross correlation matrix between signals i and j, and $\Psi = S_i r^H$, then the solution for the impulse response coefficients can be obtained by solving the following system of equations:

$$\begin{bmatrix} \Phi_{0,0} & \cdots & \Phi_{0,K} \\ \cdots & \Phi_{i,j} & \cdots \\ \Phi_{K,0} & \cdots & \Phi_{K,K} \end{bmatrix} \begin{bmatrix} \hat{h}_0 \\ \cdots \\ \hat{h}_K \end{bmatrix} = \begin{bmatrix} \psi_0 \\ \cdots \\ \psi_K \end{bmatrix} \quad (8)$$

The above system of simultaneous equations can be solved by a variety of means. The block matrix formed from the correlation matrices $\Phi_{i,j}$, is Hermitian positive definite, and so Cholesky decomposition is an efficient and numerically stable way of obtaining a solution. In this connection attention is directed to a book by G. H. Golub and C. F. Van Loan, entitled "Matrix Computations", John Hopkins University Press, 1989.

Transmissions from different base stations within a cellular mobile radio system are unlikely to be synchronized, so the location of the known data sequences for the interfering signals will be offset from that of the wanted signal, and this offset may be such that they are non-overlapping. To find the location of each data sequence is a straightforward procedure. The received signal is fed into a buffer, and multiple correlators, each matched to one of the possible known data sequences are used to find the location of the known data sequences based upon finding the position with the maximum correlator output. This procedure can be applied to the wanted signals, but usually the location of the known data sequence for this signal will have been previously determined. At this stage using the magnitudes of the correlator outputs, the K largest interferers out of a possible N are selected. Given the location of the known data sequences for each of the K+1 signals, the process of estimating the impulse response of each signal is now performed, having regard to known sequence vectors.

Performing a cross-correlation operation with the known data sequences for the K largest interferers at the positions in the received signal obtained from the search operation above yields an estimate of the impulse response for the interfering signals. The same operation is used to obtain an estimate of the impulse response for the wanted signal. Denoting the j-th coefficient of the impulse response estimate for the k-th signal as $\hat{h}_{k(j)}$, then this initial estimate can be obtained from:

$$\hat{h}_k(j) = \sum_{i=0}^{N\lambda-1} r^*(i+q_k)S_k(i-j) \quad j \in [0, D\lambda] \quad (9)$$

In the above equation r(i) are the samples of the received signal, $S_k(i)$ being the modulated samples of the known data sequence for the k-th signal, and $q_k$ the location of the start of this sequence within the received signal. The known data sequence is of duration N symbols. At this stage, each impulse response will include components of all other impulse responses, due to cross-correlation effects between the modulated data sequences of the known signals and those composing the received signal. For very large values of N, greater than 100, these terms will be sufficiently small to yield an adequate estimate of the impulse response of both wanted and interfering signals. However, in most transmission formats for mobile radio applications the length of the known sequences will be considerably less than this because such sequences have to be regularly transmitted, and so represent an overhead.

As a consequence, a technique is now described that allows the impulse response estimates obtained by the above correlation technique to be improved. From the K+1 estimates formed from the initial correlation, the one with the largest energy content is selected, and at the position of the known signal segment for this estimate, the data sequences of the remaining K signals are estimated using the impulse response estimates obtained from the cross-correlation in conjunction with the detection technique to be described later. The estimates of the data sequences will contain errors, but using decision reliability information obtained from the detector, the location of the P symbols most likely to have been in error can be identified by finding the P smallest decision reliability values. These data symbols are treated as erasures, and so $M^{KP}$ data sequence estimates result from the detection process (M being the number of data levels used). Data sequences for each of the K+1 signals are now known at one segment of the received signal. Equation (8) is then used to obtain estimates of the impulse response by computing the cross-correlation terms in the left and right hand side of equation (8) for each of the $(M^{KP}/K)$ groups of data sequence estimates. The impulse response coefficients that when substituted into equation (6) along with the appropriate modulated data sequence minimize $|e|^2$, are the ones selected.

It will be appreciated that various modifications may be made to the arrangement just before described without departing from the scope of the invention and, for example, super state trellis selection may be utilized in the sequence estimator 10 in accordance with alternative techniques as will be apparent to those skilled in the art.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

I claim as my invention:

1. A method for suppressing co-channel signals comprising the steps of:

storing at least one known data sequence in a memory;

providing a received signal;

identifying a relative location in time of the received signal;

estimating an impulse response of the received signal and generating a set of signal configurations based on the impulse response;

selecting a desired signal by comparing the received signal with the set of signal configurations in accordance with a reduced super-state trellis selection procedure, each super-state comprising an array of states of wanted and unwanted co-channel signals.

2. The method for suppressing co-channel signals of claim 1, wherein the reduced super-state trellis selection procedure is generated from a metrics generator.

3. The method for suppressing co-channel signals of claim 2, further comprising the step of estimating a sequence of the plurality of signals and providing a detected data sequence output.

4. The method for suppressing co-channel signals of claim 3, wherein said reduced super-state trellis selection procedure comprises an algorithm which computes in each data symbol period, the probabilities for the transitions emanating from (N+1)S states retained from a previous symbol period and then selects (N+1)S state from the $M^{K+1}(N+1)S$ expansions, where:

N is the number of super-state subsets,

S is the number of states in the trellis of the wanted signal,

M is the number of modulation levels,

K is the number of interfering signals.

5. The method for suppressing co-channel signals as claimed in claim 1, wherein the method is performed by a receiver that operates with signals containing known data sequences which are different for each signal and which are not mutually orthogonal, and where known portions of wanted and interfering signals do not overlap.

* * * * *